April 9, 1935.　　　G. W. POWERS　　　1,996,774
CRIBBING
Filed Aug. 23, 1930
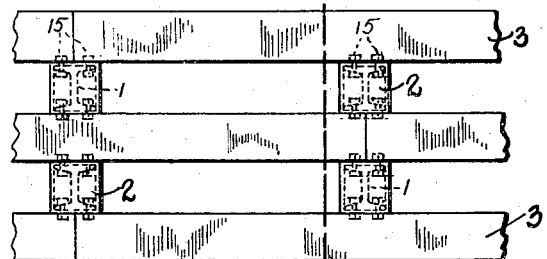
Fig. 1.
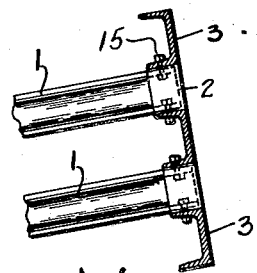
Fig. 2.
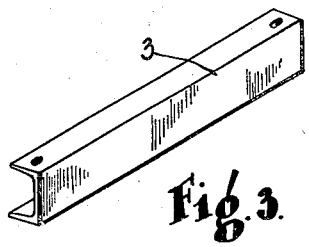
Fig. 3.
Fig. 4.
Fig. 5.
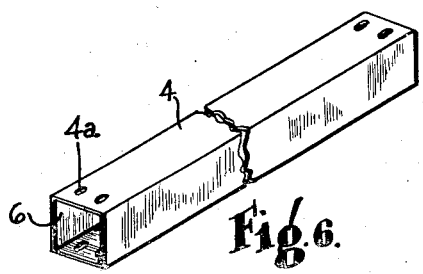
Fig. 6.
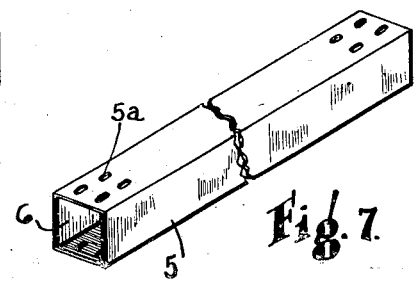
Fig. 7.
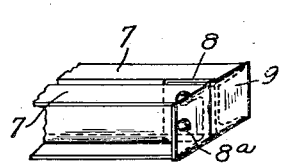
Fig. 8.
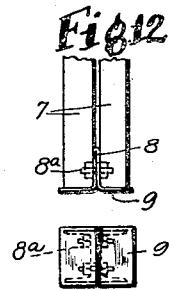
Fig. 12.
Fig. 9.
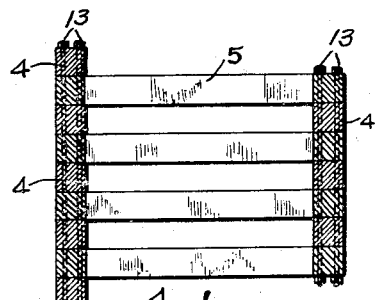
Fig. 10.
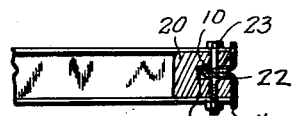
Fig. 11.
INVENTOR
George W. Powers
BY
Milburn & Milburn
ATTORNEYS.

Patented Apr. 9, 1935

1,996,774

UNITED STATES PATENT OFFICE 1,996,774

CRIBBING

George W. Powers, Cleveland, Ohio, assignor, by mesne assignments, of one-half to Lena Shimek Application August 23, 1930, Serial No. 477,446

7 Claims. (Cl. 61—47)

This invention relates to the art of cribbing.

The general object is to devise a form of cribbing in which the stretcher and header members may be constructed of metal so as to facilitate the handling and interengagement of the same, as well as to prolong their period of usefulness.

More specifically, the object of the present form of invention is to devise a cribbing structure in which the overlapping portions of the stretcher and header members are formed with registering bolt holes for the reception of bolts to secure the parts in assembly.

A still further object consists in devising such a structure in which the header members may be formed of I-beams while the stretcher members may be formed of channel irons together with suitable means of interconnection therebetween.

Another object consists in devising such a cribbing structure in which there are employed hollow metal stretcher and header members secured together by means of bolts extending through registering holes provided in the overlapping portions thereof.

Other objects will appear from the following description and claims when considered in connection with the accompanying drawing.

Fig. 1 is a diagrammatic front elevation of an assembled cribbing structure; Fig. 2 is a partial detail view of the form of connection between the I-beam stretcher members and the channel form of header members; Fig. 3 is a perspective view of one of the channel header members; Fig. 4 is an elevation of an I-beam header member with a cap applied to the end thereof; Fig. 5 is a cross-section of one of the header members shown in Fig. 4; Fig. 6 is a perspective view of a rectangular hollow form of stretcher member; Fig. 7 is a similar form of header member; Figs. 8, 9 and 12 are fragmentary detail views of another modified form of cribbing structure; Fig. 10 is a sectional view of the cribbing structure embodying the form of stretchers and headers shown in Figs. 6 and 7; and Fig. 11 shows another modification.

The header members in one form of the present case are disclosed as I-beams 1 upon which are placed the cap members 2 over the ends thereof. The stretcher members are shown in the form of channel irons 3 which have their top and bottom flanges bolted to the corresponding flanges of the header members. These bolts 15 extend also through the corresponding portions of the cap members 2, and the ends of the stretcher members may abut in staggered arrangement, as indicated. These bolts 15 may be applied for permanent connection between the parts, or, if so desired, they may be only temporarily set in place so as to permit disassembly and removal of the cribbing structure, should it be so desired.

Another form of cribbing structure comprises the hollow stretcher and header members shown in Figs. 6 and 7, respectively. In this case, the stretcher and header members are all formed of sheet metal of substantially rectangular shape in which the overlapping edge portions of the sheet metal are welded together prior to the galvanizing process. These stretcher and header members are secured together by means of bolts 13, either permanent or temporary, which extend through registering holes provided in the overlapping portions of these members. For instance, the stretcher member 4 has the bolt holes 4ª which are adapted for registration with the bolt holes 5ª of the header member 5. The stretcher members have their adjacent ends arranged in abutting relation and are staggered with respect to the overlapping end portions of the header members. The open ends of the header and stretcher members may be closed and reinforced by means of plugs or inserts at 6 of concrete, metal, or other suitable material to better withstand the load at this point and to exclude the natural elements from the inside thereof. These inserts will also be provided with registering bolt holes according to the location of the bolt holes in the stretcher and header members. The general arrangement of the members of this particular form is illustrated diagrammatically in Fig. 10.

Instead of the I-beams 1, there may be substituted the double channel form illustrated in Figs. 8, 9 and 12, in which the metal channel members 7 are arranged back to back and the vertical flange 8 of the cap member 9 inserted between the backs of the channel members. These parts are secured together by means of bolts 8a which extend through registering holes in the flange 8 and the overlying portions of the channel members 7. The cap member 9 serves as a closure for the end of the header member and at the same time serves to connect together and strengthen the companion channel members which together form the header member in each case. The same form of stretcher member may be employed as shown in Fig. 3. The enlarged cap heads engage the stretcher members.

Fig. 11 shows another modification in which the plug 20 in the end of the hollow header member has a slit 21 to receive the flanged cap member 22 which is practically the same form of cap as that indicated by reference numeral 9. The flange 10 of the cap member extends into the slit of the plug 20 and a bolt 23 or bolts extend through registering holes in the header member, the plug and the flange of the cap member. Thus, all of these parts are secured together. The head 11 of the cap member is somewhat larger than the end of the header member so as to provide means of interlocking engagement with the stretcher members.

My header and stretcher members and the means for securing the same together are of a comparatively simple construction and yet they possess increased efficiency and convenience in installation and use. They can also be disassembled and re-assembled whenever so desired. They are destined for longer life than the structures used heretofore and the cost of manufacture is comparatively reasonable.

In all of the several forms of structures herein set forth, there may be employed also the fillers between the stretcher members for preventing escape of silt or the like through the space between the stretchers, as described and explained in my copending application Serial No. 447,445, filed August 23, 1930.

Other advantages will be apparent to those who are skilled in the art to which the present invention relates.

What I claim is:

1. A cribbing structure comprising metal header members in the form of I-beams, metal stretcher members in the form of channels, said members having their flanges in overlapping relation, polygonal cap members for the overlapping end portions of said header members, said overlapping flange portions having registering holes therethrough, and means extending through said holes for securing the members in assembly.

2. A cribbing structure comprising metal header members in the form of I-beams, metal stretcher members in the form of channels, said members having their flanges in overlapping relation, rectangular cap members for the overlapping end portions of said header members, said overlapping flange portions having registering bolt holes extending therethrough, and removable bolts extending through said holes for securing the members in assembly.

3. A cribbing structure comprising header members having top and bottom flanges, stretcher members having top and bottom flanges, said members having their flanges in overlapping relation, cap members associated with the overlapping end portions of said header members, and means for securing the members in assembly.

4. A cribbing structure comprising header members having top and bottom flanges, stretcher members having top and bottom flanges, said members having their flanges in overlapping relation, cap members associated with the overlapping end portions of said header members, said overlapping flange portions having registering holes therethrough, and means extending through said holes for securing the members in assembly.

5. A cribbing structure comprising metal header members in the form of I-beams, metal stretcher members in the form of channels, said members having their flanges in overlapping and parallel relation, and means for securing the overlapping flanges in assembly.

6. In a cribbing structure, a header member comprising two channels placed back to back, and a cap member T-shaped in section, the central member of the T-section being clamped between the backs of the channels and the lateral branches of the T-section serving to close the open ends of the channels.

7. A cribbing structure, comprising metal headers in the form of I-beams, metal stretchers in the form of channels, said members having overlapping flange portions with registering holes therethrough and securing members extending through said holes and through the bottom flange of one member and the top flange of the adjacent member to secure the contiguous members together.

GEORGE W. POWERS.